March 24, 1959      O. W. LAYNG      2,879,377
CAMERA FLASH BULB SHIELD AND LIGHT CONTROL UNIT
Filed Sept. 26, 1955
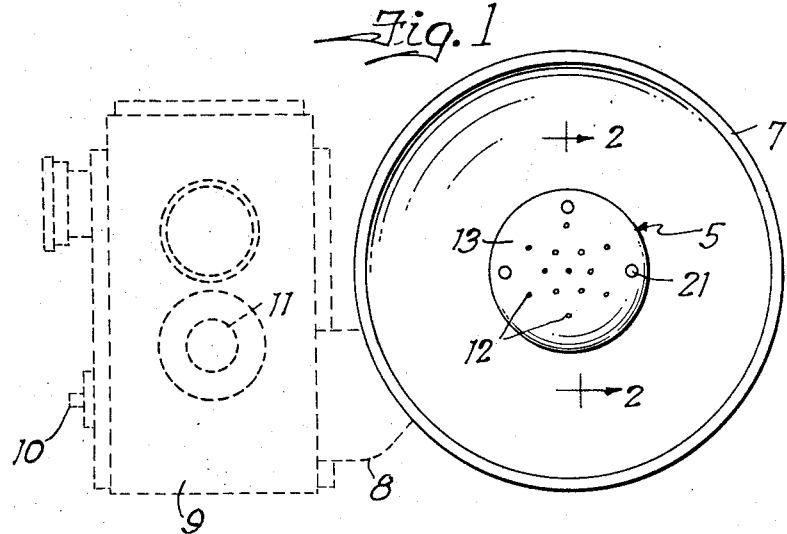
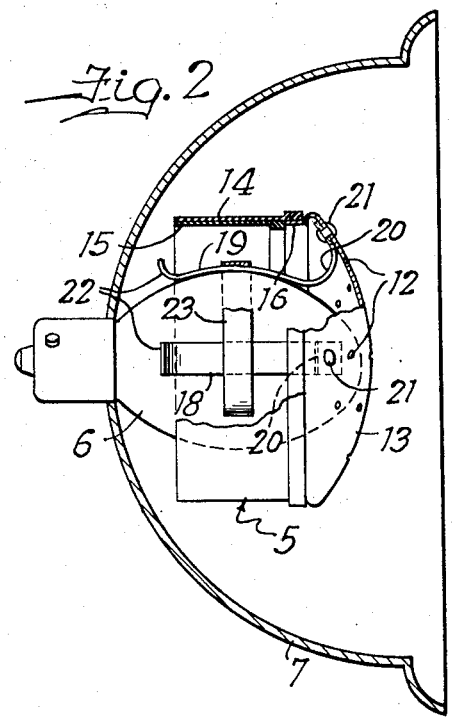 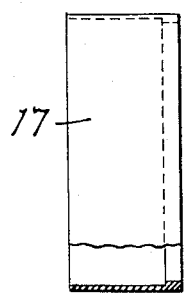
Inventor
Oral W. Layng

United States Patent Office 2,879,377
Patented Mar. 24, 1959

2,879,377

CAMERA FLASH BULB SHIELD AND LIGHT CONTROL UNIT

Oral W. Layng, Rockford, Ill.

Application September 26, 1955, Serial No. 536,522

15 Claims. (Cl. 240—1.3)

This invention relates to a flash bulb attachment for cameras designed to be applied over the front of the bulb within the reflector, to prevent the glare that so frequently results, especially on close-ups, the present attachment being designed to allow only a certain amount of pinpoint direct lighting of the subject, to obtain the desired high lights, while all of the rest of the light is deflected, diffused, and filtered, with a view to obtaining better all around lighting of the subject.

For pictures taken at a distance of seven to eight feet away, the filter sleeve is removable and the deflector, within which this filter fits, is used alone for light diffusion and to obtain sufficient lighting at that distance. At distances of ten feet or more, where one needs all the light available, the attachment is removed. On the other hand, for close-ups in the range from say four-and-one-half to say seven feet the present attachment with a suitable filter sleeve inserted in the diffuser gives excellent results, the coloring of the subject and the kind of film used determining the color of the filter sleeve selected. Thus, for example, if panchromatic film is used, which has a tendency to pick up red coloring causing flesh tones to be overexposed and overcorrected so that the middle tones and high lights are alike, unless a red filter sleeve is employed in the diffuser the resulting negative has one tone and unattractive flat-toned prints are obtained. Red, yellow, blue and green filters are provided for use interchangeably in this attachment, thus making it unnecessary in the purchase of flash bulbs to get anything but plain bulbs, instead of using a blue bulb, for example, when taking a picture inside with outside color film.

The invention is illustrated in the accompanying drawing, in which—

Fig. 1 is a front view of a camera, the flash bulb of which is equipped with an attachment made in accordance with my invention, only the attachment and reflector being shown in full lines;

Fig. 2 is a view partly in side elevation and partly in longitudinal section on the line 2—2 of Fig. 1, showing the flash bulb and the attachment substantially full size and indicating the reflector in section, and Fig. 3 is a view partly in side elevation and partly in longitudinal section of one of the filter sleeves.

The same reference numerals are applied to corresponding parts throughout the views.

Referring to the drawing, the attachment of my invention is indicated generally by the reference numeral 5, and is shown applied to a conventional flash bulb 6 inserted in the socket at the center of the reflector 7. The latter is attached by means of the conventional bracket 8 to the camera 9, and the flash bulb is electrically connected with the battery in the camera, so that when the push button 10, which operates the shutter 11, is depressed, the flash bulb 6 provides the flash for illumination of the subject, in the usual way, except that the attachment 5 deflects about 90° of the light, allowing only about 10% to pass through the pin holes 12 in the circular deflector 13, disposed directly in front of and in substantially concentric relation to the flash bulb 6, for the desired high lights. The deflected light is diffused and filtered by passage through sleeves 14 and 15, that are carried on the annular rim 16 of the deflector and extend rearwardly from the deflector in substantially concentric relation to the flash bulb 6. The deflector 13 may be metallic or plastic. The diffuser sleeve 14 is preferably made of ground glass film, and is suitably secured to the rim 16 as by cementing. The filter sleeve 15 and the two or three other filter sleeves of different colors to be used interchangeably with filter 15 inside the diffuser 14 in close telescoping relation are also preferably made of film suitably colored, one such additional filter being indicated at 17 in Fig. 3. As stated before, four interchangeable filter sleeves will be provided, in green, yellow, red and blue. A red filter sleeve absorbs or reduces red coloring besides reducing the amount of light passing through it, and, as indicated before, that color of filter is particularly suited for use with panchromatic film.

The attachment is supported on the flash bulb 6 by a holder 18, consisting of three spring fingers 19 disposed lengthwise of the bulb in circumferentially spaced relation, each having an outwardly curved front end portion 20 that is riveted, or otherwise suitably secured, to the back of the deflector 13, as indicated at 21, and having an outwardly curved rear end 22 which will slide nicely over the bulb when the attachment is applied, the three fingers 19 being interconnected by an arcuate band 23 that fits like a saddle around the bulb at its maximum mid-diameter throughout more than 180°, so as to center the attachment 5 accurately with respect to the bulb.

In operation, after a flash bulb 6 has been inserted in the socket in the center of the reflector 7, the attachment 5 is applied, and will be equipped with a red filter sleeve 15, or a blue filter sleeve 17, depending on the kind of film being used and the kind of picture being taken. The filter sleeve employed might also be either yellow or green. The shutter 11 is operated in the usual way by depression of the button 10, and the flash occurs simultaneously with the operation of the shutter, but only about 10% of the raw light from the flash is transmitted through the pin holes 12 for high lights on the subject, about 90% of the light being diffused and filtered after deflection by deflector 13. The soft lighting resulting from the diffused light reflected by reflector 7 eliminates any possibility of a glare, while the color separation obtained with the filter eliminates over-lighting and over-exposure, so that the resulting negatives on close-ups are far superior to what would otherwise be obtained and the prints made from such negatives are much more satisfactory. In conclusion, it is also worth mentioning that the attachment 5 serves as a glass-fragments shield in the event the flash bulb bursts. This is of particular benefit in taking close-up pictures.

It is believed the foregoing description conveys a good understanding of the objects and advantages of my invention. The appended claims have been drawn to cover all legitimate modifications and adaptations.

I claim:

1. The combination with a camera flash bulb and the reflector therefor, of a light deflector supported in front of the bulb in substantially concentric relation thereto having pin holes provided therein for very limited (approximately 10%) light passage therethrough, and a tubular light diffuser enclosing the bulb between the deflector and reflector.

2. The combination set forth in claim 1, including a color filter through which the light from the bulb must pass before reaching the reflector, said filter being disposed behind the deflector and enclosing the bulb between the deflector and reflector.

3. The combination set forth in claim 1, including a tubular color filter in telescoping relationship to said tubular light diffuser.

4. The combination with a camera flash bulb and the reflector therefor, of a light deflector supported in front of the bulb in substantially concentric relation thereto having pin holes provided therein for very limited (approximately 10%) light passage therethrough, and a tubular color filter enclosing the bulb between the deflector and reflector.

5. The combination with a camera flash bulb and the reflector therefor, of a light deflector supported in front of the bulb in substantially concentric relation thereto having pin holes provided therein for very limited (approximately 10%) light passage therethrough, and a tubular combination light diffuser and color filter enclosing the bulb between the deflector and reflector.

6. The combination with a camera flash bulb and the reflector therefor, of a circular concavo-convex light deflector in front of the bulb supported on the bulb in substantially concentric relationship thereto with the convex side out and having pin holes provided therein allowing very restricted (approximately 10%) light passage therethrough, and a tubular light diffuser supported by the deflector enclosing the bulb between the deflector and reflector.

7. The combination set forth in claim 6, including a color filter through which the light from the bulb must pass before reaching the reflector, said filter being disposed behind the deflector and enclosing the bulb between the deflector and reflector.

8. The combination set forth in claim 6, including a tubular color filter in telescoping relationship to said tubular light diffuser.

9. The combination with a camera flash bulb and the reflector therefor, of a light deflector supported in front of the bulb in substantially concentric relation thereto having pin holes provided therein for very limited (approximately 10%) light passage therethrough, and a tubular color filter supported by the deflector enclosing the bulb between the deflector and reflector.

10. The combination with a camera flash bulb and the reflector therefor, of a light deflector supported in front of the bulb in substantially concentric relation thereto having pin holes provided therein for very limited (approximately 10%) light passage therethrough, and a tubular combination light diffuser and color filter supported by the deflector enclosing the bulb between the deflector and reflector.

11. The combination with a camera flash bulb and the reflector therefor, of a combination glass-fragments shield and light control unit in the form of a light deflector disposed adjacent the outer end of the bulb and having supporting means applicable over and supported on the bulb, the deflector having pin holes provided therein allowing only very limited light passage therethrough forwardly from the bulb, and a tubular light diffuser extending rearwardly from the light deflector and enclosing the bulb between the deflector and reflector.

12. The combination set forth in claim 11, including a color filter through which the light from the bulb must pass before reaching the reflector, said filter being disposed behind the deflector and enclosing the bulb between the deflector and reflector.

13. The combination set forth in claim 11, including a tubular color filter in telescoping relationship to said tubular light diffuser.

14. The combination with a camera flash bulb and the reflector therefor, of a combination glass-fragments shield and light control unit in the form of a light deflector disposed adjacent the outer end of the bulb and having supporting means applicable over and supported on the bulb, the deflector having pin holes provided therein allowing only very limited light passage therethrough forwardly from the bulb, and a tubular combination light diffuser and color filter extending rearwardly from the deflector and enclosing the bulb between the deflector and reflector.

15. The combination with a camera flash bulb and the reflector therefor, of a combination glass-fragments shield and light control unit in the form of a light deflector disposed adjacent the outer end of the bulb and having supporting means applicable over and supported on the bulb, the deflector having pin holes provided therein allowing only very limited light passage therethrough forwardly from the bulb, and a tubular color filter extending rearwardly from the deflector and enclosing the bulb between the deflector and reflector.

References Cited in the file of this patent

UNITED STATES PATENTS

| Number | Name | Date |
|---|---|---|
| 1,120,927 | Godley | Dec. 15, 1914 |
| 1,747,635 | Jackson | Feb. 18, 1930 |
| 1,824,894 | Hopkins | Sept. 29, 1931 |
| 1,990,287 | Jones et al. | Feb. 5, 1935 |
| 2,046,388 | Kurlander | July 7, 1936 |
| 2,205,860 | Olds | June 25, 1940 |
| 2,326,004 | Barrett | Aug. 3, 1943 |
| 2,392,502 | Potter | Jan. 8, 1946 |
| 2,437,522 | Handler | Mar. 9, 1948 |
| 2,614,783 | Spear | Oct. 21, 1952 |

FOREIGN PATENTS

| Number | Country | Date |
|---|---|---|
| 62,227 | France | June 13, 1955 |
| 742,679 | Great Britain | Dec. 30, 1955 |